(12) United States Patent
Flores et al.

(10) Patent No.: US 6,493,501 B2
(45) Date of Patent: Dec. 10, 2002

(54) OPTICAL FIBER INTERCONNECTION CLOSURES

(75) Inventors: Alfred E. Flores, Taylorsville, NC (US); Steve A. Fontaine, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/116,884

(22) Filed: Apr. 5, 2002

(65) Prior Publication Data

US 2002/0106177 A1 Aug. 8, 2002

Related U.S. Application Data

(60) Division of application No. 09/438,737, filed on Nov. 11, 1999, which is a continuation-in-part of application No. 09/379,939, filed on Aug. 24, 1999, now Pat. No. 6,292,614.

(51) Int. Cl.[7] .............................................. G02B 6/00
(52) U.S. Cl. ...................................... 385/135; 385/134
(58) Field of Search .................................. 385/134, 135

(56) References Cited

U.S. PATENT DOCUMENTS

| 4,666,240 A | 5/1987 | Caron et al. ............... 350/96.2 |
| 4,679,896 A | 7/1987 | Krafcik et al. ............. 350/96.2 |
| 4,685,764 A | 8/1987 | Hoffer et al. .............. 350/96.2 |
| 4,958,903 A | * 9/1990 | Cobb et al. ................. 385/135 |
| 5,450,518 A | * 9/1995 | Burek et al. ................ 385/135 |
| 5,479,553 A | 12/1995 | Daems et al. ............... 385/135 |
| 5,556,060 A | * 9/1996 | Bingham et al. ............. 248/49 |
| 5,631,993 A | 5/1997 | Cloud et al. ................ 385/135 |
| 5,644,671 A | 7/1997 | Goetter et al. ............. 385/135 |
| 5,652,820 A | * 7/1997 | Glaser et al. ............... 385/134 |
| 5,692,299 A | 12/1997 | Daems et al. ................. 29/869 |

OTHER PUBLICATIONS

SIECOR, Splice Closure, SHD–10/Sep. 1995, 4 pages.

* cited by examiner

*Primary Examiner*—Rodney Bovernick
*Assistant Examiner*—Sung Pak

(57) ABSTRACT

A converting assembly and method for creating an in-line closure from a first end cap and a first support frame of a butt-type closure includes a second support frame and a second end cap. An elongate housing defines an internal cavity, a front opening at the front end of the housing, and a rear opening at the rear end of the housing. The front and rear openings are contemporaneously respectively occluded by the first and second end caps while the first end cap is connected to the front end of the first support frame and the second end cap is connected to the rear end of the second support frame. The front end of the second support frame is connected to the rear end of the first support frame so that the first and second support frames are enclosed within the internal cavity defined by the housing.

9 Claims, 14 Drawing Sheets

OPTICAL FIBER INTERCONNECTION CLOSURES

CROSS-REFERENCE TO RELATED APPLICATION

This patent application is a divisional of application Ser. No. 09/438,737 filed Nov. 11, 1999, which is a continuation-in-part of application Ser. No. 09/379,939 filed Aug. 24, 1999 now U.S. Pat. No. 6,292,614 and entitled Movable Bracket for Holding Internal Components of an Optical Fiber Interconnection Closure During Servicing and Associated Method.

FIELD OF THE INVENTION

The present invention relates generally to optical fiber interconnection closures and, more particularly, to internal structures of optical fiber interconnection closures.

BACKGROUND OF THE INVENTION

Fiber optic networks typically include interconnection closures at various splice locations throughout the fiber optic network. Typically, these interconnection closures include splice closures and patch closures. For example, splice closures commonly house the splices connecting the optical fibers of one or more distribution cables to respective ones of the optical fibers of a fiber optic feeder cable. By housing the splices, a splice closure protects the spliced end portions of the optical fibers from environmental degradation, strain, and other deleterious forces, thereby increasing the reliability and quality of the splices.

As known to those of ordinary skill in the art, a variety of splice closures have been designed. For example, a typical butt-type splice closure includes a housing open at one end and a single end cap positioned within the open end of the housing. Each of the fiber optic cables associated with the butt-type splice closure extends through the single end cap. As an additional example, a typical in-line splice closure includes a housing open at both of its opposite ends and a pair of end caps respectively positioned within the open ends of the housing so fiber optic cables can enter the in-line splice closure from either end of the housing.

Conventional splice closures of the above-described types generally include a frame that is connected to the end cap(s) and carries a number of splice trays that are disposed in a stacked arrangement within the housing. Each splice tray generally includes a series of splice holders for receiving the spliced end portions of a pair of optical fibers.

As optical fibers continue to be used in greater numbers, the demand increases for splice closures that can carry and provide access to large numbers of fiber optic cables, optical fibers, and optical fiber splices. Whereas some conventional splice closures can be characterized as sufficiently carrying and providing access to large numbers of fiber optic cables, optical fibers, and optical fiber splices, there is always a demand for new splice closure structures that enhance the capability for optimally carrying and providing access to large numbers of fiber optic cables, optical fibers, and optical fiber splices.

SUMMARY OF THE INVENTION

The present invention provides splice closures and components of splice closures that enhance the capability for optimally carrying and providing access to large numbers of fiber optic cables, optical fibers, and optical fiber splices.

In accordance with one aspect of the present invention, a closure for receiving at least one fiber optic cable and for containing optical fibers and optical fiber splices is provided. The closure includes an elongate housing having front and rear ends. The housing extends in a longitudinal direction extending between the front and rear ends. The housing defines an internal cavity extending in the longitudinal direction, and at least one opening to the internal cavity. An end cap occludes the opening of the housing. The end cap defines ports through which fiber optic cables extend. The end cap includes a periphery extending around the ports. A support frame is connected to the end cap, extends in the longitudinal direction, and is positioned in the internal cavity of the housing. The support frame includes an elongate support member having opposite front and rear ends. The support member extends in the longitudinal direction, the front end of the support member is oriented toward the front end of the housing, and the rear end of the support member is oriented toward the rear end of the housing. The support frame further includes upper and lower front extensions. Each of the front extensions is connected to the support member proximate to the front end of the support member. The front extensions extend away from the support member and diverge with respect to one another. The upper front extension is connected to the end cap at an upper position proximate to the periphery of the end cap. The lower front extension is connected to the end cap at a lower position proximate to the periphery of the end cap and distant from the upper position. A plurality of container-like devices for containing optical fibers are carried by the support member. At least two of the container-like devices are positioned on opposite sides of the support member from one another. Therefore, one of the two container-like devices can be accessed without accessing the other of the two container-like devices.

In accordance with one example of the present invention, each of the two container-like devices carried on opposite sides of the support member are slack baskets for containing at least some of the optical fibers. In accordance with another example of the present invention, one of the two container-like devices carried on opposite sides of the support member is a splice tray, and the other of the two container-like devices is a slack basket. In accordance with another example of the present invention, each of the two container-like devices carried on opposite sides of the support member are splice trays. In accordance with yet another example of the present invention, one of the two container-like devices carried on opposite sides of the support member is a slack basket, and the other of the two container-like devices is an organizer assembly. The organizer assembly includes a plurality of spaced apart partitions defining a plurality of receptacles for respectively receiving splice trays.

In accordance with another aspect of the present invention, an elongate channel and an elongate opening to the channel extend along the back side of an organizer assembly carried by the support member. A bottom side of the organizer assembly is oriented toward the support member, and the back side is adjacent to the bottom side and opposite from the tray-receiving openings to the receptacles of the organizer assembly. The channel is designed to receive and at least partially enclose a section of optical fibers extending between a first position proximate the end cap and a second position proximate the rear end of the organizer assembly. Therefore, the channel advantageously facilitates the routing of optical fibers within the closure.

In accordance with another aspect of the present invention, a transition plate is mounted to the top of an organizer assembly carried by the support member. The transition plate includes a surface and a plurality of protrusions protruding angularly away from the surface. Each protrusion defines an aperture for receiving a tie that holds at least some of the optical fibers. For example, at least one of the protrusions can be an arch, a tab, or the like. The transition plate advantageously facilitates the routing of optical fibers within the closure.

In accordance with another aspect of the present invention, an adjustment bracket is mounted in movable relation to the support member. The adjustment bracket is movable toward and away from an organizer assembly carried by the support member. The adjustment bracket is operative to abut the splice trays received by the receptacles of the organizer. The adjustment bracket at least partially secures splice trays within the closure. Further, the adjustment bracket can accommodate splice trays of different sizes.

In accordance with another aspect of the present invention, the front extensions of the support frame cooperate to define a generally U-like shape. More specifically, the support member portion of the support frame defines a member axis extending between the front and rear ends of the support member. Each of the front extensions extend both generally radially away from proximate the member axis and longitudinally away from proximate the front end of the support member.

In accordance with another aspect of the present invention, one or multiple flanges protrude from the front extensions. Strain relief brackets are mounted to respective flanges and receive fiber optic cables. The flanges are arranged so the strain relief brackets are optimally placed proximate the cable-receiving ports of the end cap.

In accordance with another aspect of the present invention, the support frame further includes upper and lower rear extensions. Each of the rear extensions is connected to the support frame proximate to the rear end of the support member. The rear extensions extend away from rear end of the support member, the rear extensions diverge with respect to one another, and the rear extensions extend toward the front end of the support member. Buffer tubes abut the rear extensions, and the rear extensions function to at least partially restrict movement of the buffer tubes, so the buffer tubes are maintained in an organized arrangement.

In accordance with another aspect of the present invention, two bars are joined together to provide the support frame and the support member can be characterized as a composite support member. The front ends of the bars are the front extensions of the support frame. More specifically, the front ends of the bars diverge from one another, in the longitudinal direction, and forwardly away from the front end of composite support member. The rear ends of the bars are the rear extensions of the support frame. More specifically, the rear ends of the bars diverge from one another and forwardly away from the rear end of the composite support member.

Whereas numerous butt-type closures are within the scope of the present invention, numerous in-line type closures are also within the scope of the present invention. For example, in accordance with one aspect of the present invention, the above-described rear extensions can be characterized as a first pair of rear extensions, and a second pair of rear extensions are connected to the first pair of rear extensions and extend rearward from the first pair of rear extensions. Further, a secondary end cap is connected to the second pair of rear extensions.

Accordingly, the present invention advantageously provides splice closures and components of splice closures that enhance the capability for optimally carrying and providing access to large numbers of fiber optic cables, optical fibers, and optical fiber splices.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so this disclosure will be thorough and complete and will fully convey the scope of the invention to those of ordinary skill in the art. Like numbers refer to like elements throughout.

The present invention provides splice closures and components thereof that enhance the capability for optimally carrying and providing access to large numbers of fiber optic cables, optical fibers, and optical fiber splices.

First Embodiment

Figure 1:
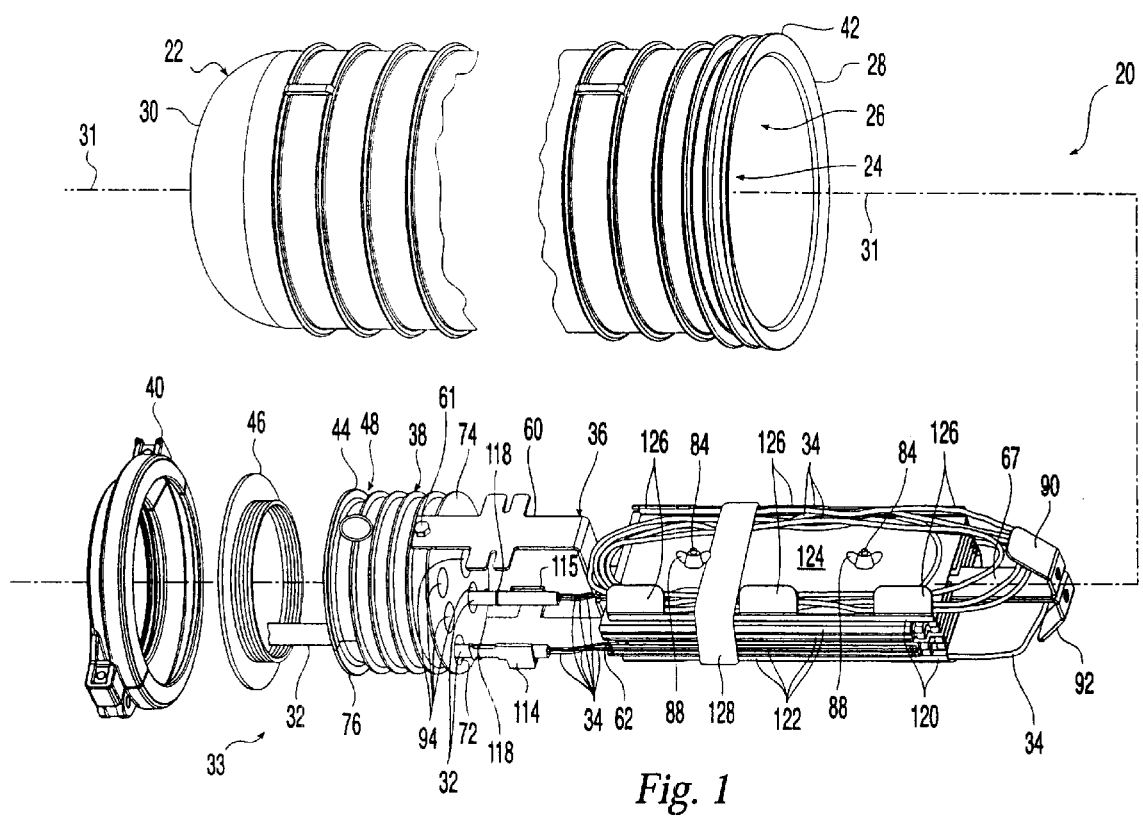
FIG. 1 is a partially exploded, partially schematic, perspective view of a butt-type splice closure for containing optical fiber splices in accordance with a first embodiment of the present invention.

Referring now to FIG. 1, an optical fiber interconnection closure in the form of a butt-type splice closure 20 is illustrated in accordance with a first embodiment of the present invention. As illustrated, closure 20 includes a housing 22 defining an internal cavity 24 and an opening 26 to the cavity. Whereas housing 22 can have a variety of shapes, the illustrated housing has a generally cylindrical shape. In accordance with the first embodiment, opening 26 is positioned at a front end 28 of housing 22, and the opposite rear end 30 of the housing is closed. Housing 22 extends in a longitudinal direction extending between the front and rear ends 28,30. The wall of housing 22 extends around and defines a housing axis 31 extending between the front and rear ends 28,30. The cavity 24 receives and the housing 22 carries a butt-type support assembly 33. Support assembly 33 holds fiber optic cables 32. Buffer tubes 34 containing optical fibers (not shown) generally extend from end portions of the fiber optic cables 32. Support assembly 33 supports buffer tubes 34 and splices (not shown) that connect the optical fibers. The buffer tubes can contain individual optical fibers or optical fiber ribbons.

More specifically, support assembly 33 includes an end cap 38 and a butt-type support frame 36 connected to and extending rearward from end cap 38. In accordance with the first embodiment, support frame 36 is carried by end cap 38 in a cantilever-like fashion. Support assembly 33 is movable between an enclosed configuration and an unenclosed configuration. End cap 38 is positioned in the opening 26 of the housing 22 during the enclosed configuration. Support frame 36 and the components carried thereby are positioned within cavity 24 of housing 22 during the enclosed configuration. In contrast, end cap 38 is removed from opening 26 to provide the unenclosed configuration. Likewise, support frame 36 and the components carried thereby are removed from the cavity 24 during the unenclosed configuration.

Although the end cap 38 can be secured to the housing 22 in a variety of different manners, closure 20 includes a split annular collar 40 that securely engages a circumferential flange 42 of housing 22 and a circumferential flange 44 of end cap 38 to secure the end cap to the housing. The collar 40 and circumferential flanges 42, 44 cooperate with an O-ring 46 that is received in a circumferential channel 48 defined by end cap 38. As a result, and assuming all other openings to cavity 24 are sealed, housing 22 is substantially watertight while the closure is in the enclosed configuration.

Figure 2:
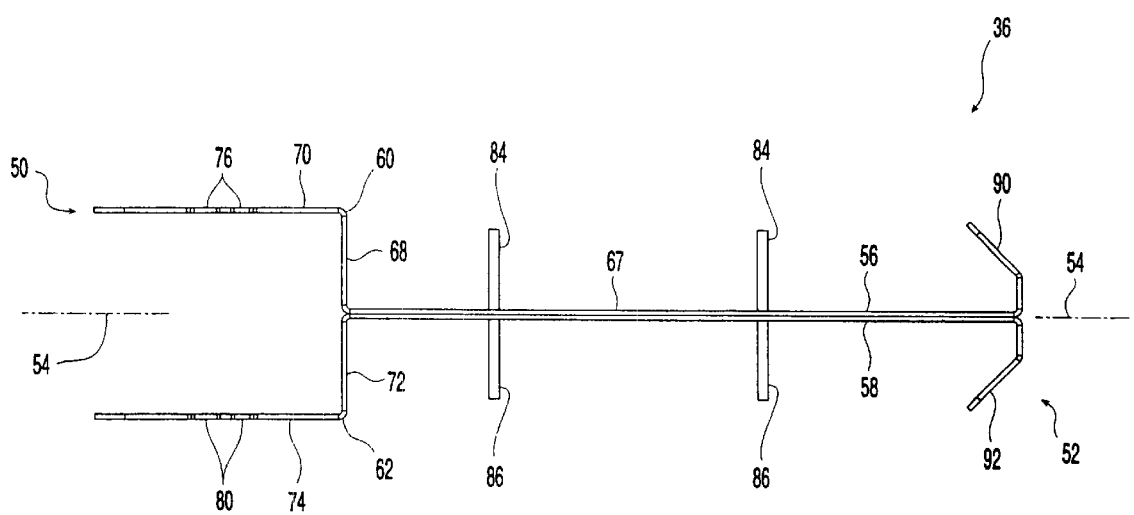
FIG. 2 is a partially schematic, isolated side elevation view of a butt-type support frame of the closure of FIG. 1.
Figure 3:
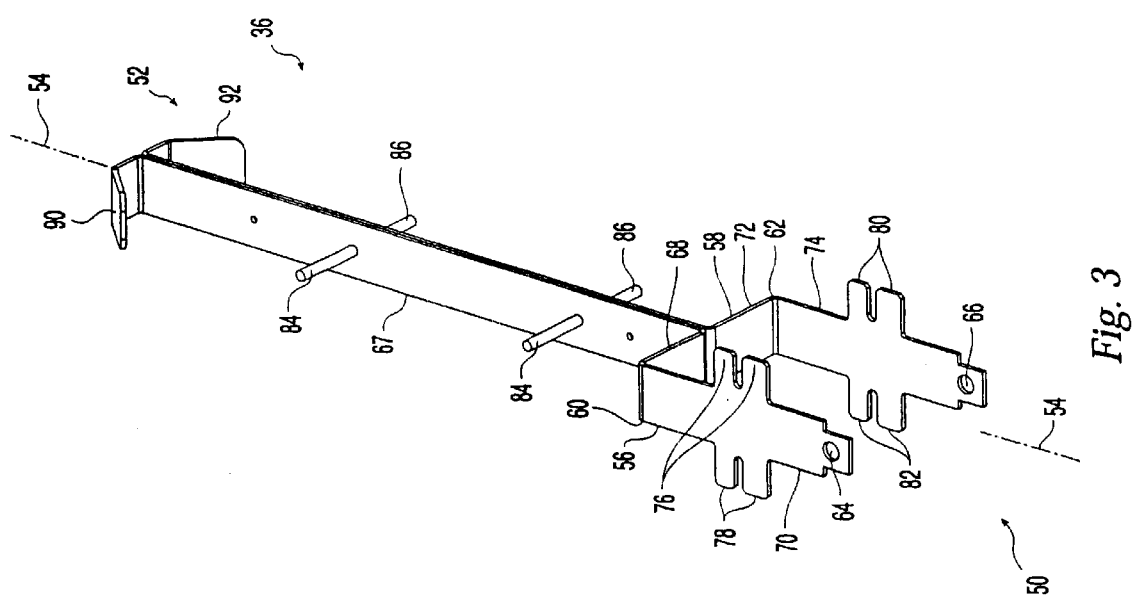
FIG. 3 is a partially schematic, isolated perspective view of the butt-type support frame of the closure of FIG. 1.

As best seen in FIGS. 2 and 3, the support frame 36 has a front end 50 and an opposite rear end 52. Support frame 36 defines a frame axis 54 extending between the front and rear ends 50, 52, is coaxial with the housing axis 31 when in the enclosed configuration. See FIG. 1.

As best seen in FIG. 2, support frame 36 is constructed from an upper bar 56 and a lower bar 58. Upper bar 56 includes a forward upper extension 60, and the forward end of the forward upper extension is connected to an upper portion of end cap 38 (FIG. 1). Likewise, lower bar 58 includes a forward lower extension 62 connected to a lower portion of end cap 38. More specifically, an upper attachment hole 64 (FIG. 3) is defined through forward upper extension 60. A bolt 61, or the like, passes through upper attachment hole 64 to attach forward upper extension 60 to end cap 38. Likewise, a lower attachment hole 66 (FIG. 3) is defined through forward lower extension 62. A bolt (not shown), or the like, passes through lower attachment hole 66 to attach forward lower extension 62 to end cap 38. As shown in FIG. 1, end cap 38 has a generally cylindrical peripheral or circumferential surface, and forward extensions 60, 62 are mounted to the end cap proximate to opposite sides of the circumferential surface.

Referring to FIG. 2, forward upper and lower extensions 60,62 extend rearward from end cap 38 (FIG. 1). Thereafter, they extend in a converging manner so that the upper and lower bars 56, 58 converge. Elongate sections of upper and lower bars 56, 58 extend contiguously to provide a composite support member 67. Composite support member 67 extends rearward of the convergence between the upper and lower bars 56, 58. The contiguous sections of the bars 56, 58 are joined to one another, such as through the use of welding techniques, or the like. The composite support member 67 defines a member axis that is coaxial with the frame axis 54. In accordance with the first embodiment, the composite support member 67 is centered with respect to the forward extensions 60, 62.

More specifically, the forward upper and lower extensions 60,62 each include a part 68,72, respectively, extending generally radially away from the frame axis 54. The forward upper and lower extensions 60,62 further include longitudinally extending parts 70,74, respectively, extending generally in the longitudinal direction. An angle of approximately 180 degrees is defined between the radially extending part 68 of the forward upper extension 60 and the radially extending part 72 of the forward lower extension 62.

As best seen in FIG. 3, forward upper extension 60 includes a pair of laterally extending and spaced apart right flanges 76, as well as laterally extending and spaced apart left flanges 78. Likewise, the forward lower extension 62 includes flanges 80 and flanges 82.

Upper bar 56 includes an upper rear extension 90 and the lower bar 58 includes a lower rear extension 92. The rear extensions 90, 92 extend away from composite support member 67, in a divergent manner with respect to one another, and toward front end 50 of support frame 36. As best seen in FIG. 2, each of the rear extensions 90, 92 includes a part extending perpendicularly with respect to the composite support member 67, and another part extending acutely with respect to the composite support member.

Whereas it is preferred for the support frame 36 to be constructed from the two distinct bars 56, 58, it is within the scope of the present invention for the support frame to be a unitary or one-piece component. For example, in accordance with an alternative embodiment of the present invention, the support frame 36 is constructed using casting techniques, or the like, so the support frame is a unitary or one-piece component.

A pair of spaced apart upper studs 84 are connected to and extend upward from the upper surface of support member 67. Likewise, a pair of spaced apart lower studs 86 are connected to and extend downward from the lower surface of support member 67. Studs 84, 86 are preferably threaded and each has a respective wing nut, or a quick connecting and disconnecting item, or the like, removably fastened thereto. As shown, a pair of wing nuts 88 are respectively threaded onto the pair of upper studs 84.

Figure 4:
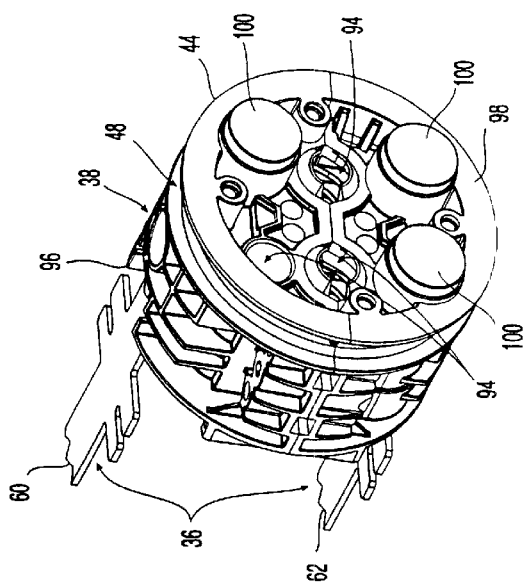
FIG. 4 is a front perspective view of an end cap and a portion of the butt-type support frame of the closure of FIG. 1.
Figure 5:
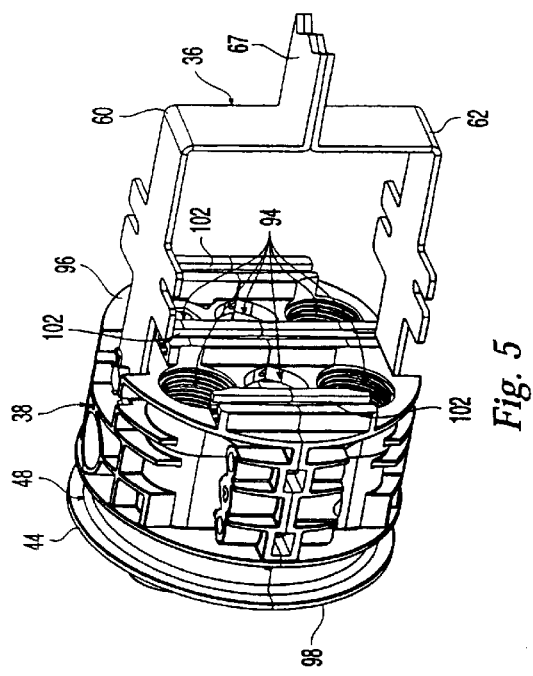
FIG. 5 is a rear perspective view of the end cap and a portion of the butt-type support frame of the closure of FIG. 1.

As best seen in FIGS. 4 and 5, end cap 38 defines multiple ports 94 that extend through the end cap for respectively receiving fiber optic cables 32. Ports 94 are open at the rear side 96 of end cap 38. However, covers 100 removably cover some of ports 94 so that some of the ports 94 are open at the front side 98 of the end cap 38. Fiber optic cables 32 extend through respective ports 94 of the end cap 38. Whereas only two of the ports 94 are illustrated as being occupied by fiber optic cables 32 in FIG. 1, each of the ports 94 may receive a respective fiber optic cable or a respective portion of a fiber optic cable.

As best understood with reference to FIG. 1, for each fiber optic cable 32 it is preferred for a hose clamp 118, or the like, to extend around the fiber optic cable and attach the fiber optic cable to a strain-relief bracket. For example, a right strain-relief bracket 114 is connected to flanges 80 (FIG. 3) of forward lower extension 62, and likewise a left strain-relief bracket 115 is connected to flanges 82 (FIG. 3). Whereas only two strain-relief brackets 114, 115 are illustrated in FIG. 1, each of the pairs of flanges 76, 78, 80, 82 (FIG. 3) may receive a strain-relief bracket. Further, other strain-relief brackets can be received by channels 102 (FIG. 5) defined by the rear side 96 of the end cap 38 to strain relief cables passing through center ports 94.

Figure 6:
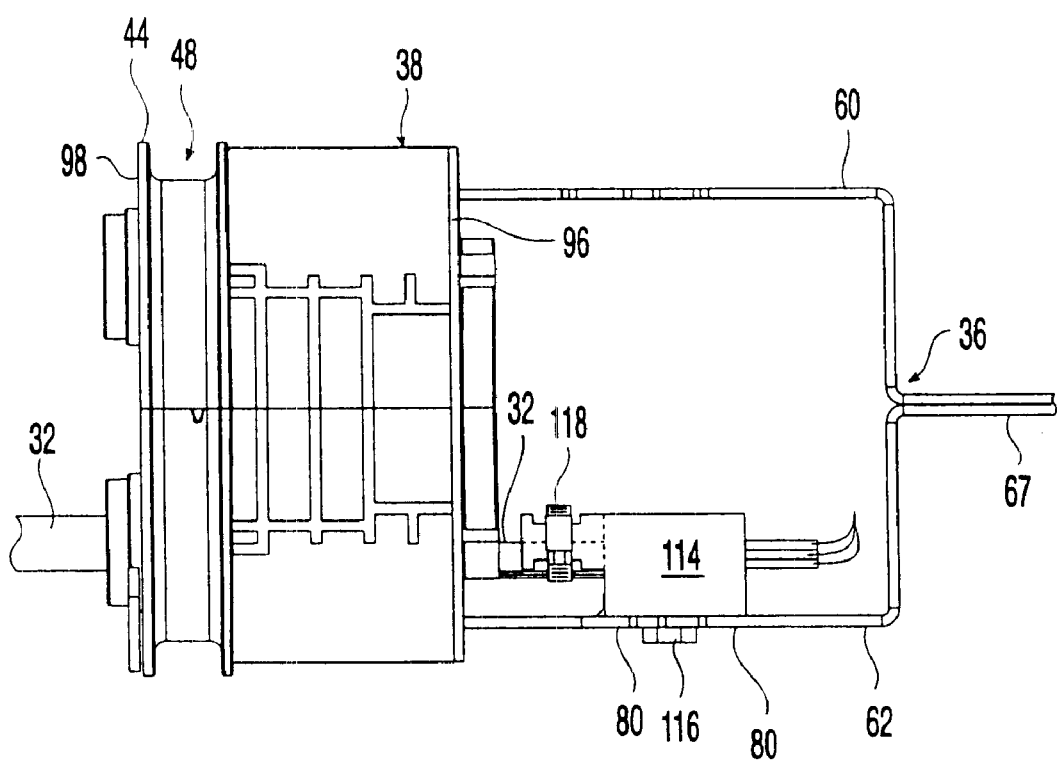
FIG. 6 is a partially schematic, side elevation view of the end cap, a portion of the butt-type support frame, and other components of the closure of FIG. 1.

As best seen in FIG. 6, strain-relief bracket 114 is positioned upon the inward-oriented surfaces of the pair of right flanges 80 (also see FIG. 3) of the forward lower extension 62. A screw 116, or the like, extends through the gap defined between the pair of right flanges 80 and into an aperture (not shown) defined in the strain-relief bracket 114 to secure the strain-relief bracket to the forward lower extension 62. The fiber optic cable 32 can be pulled through end cap 38 beyond flanges 80 to allow an operator to attach hose clamp 118 and bracket 114 to cable 32. Cable 32 is then pulled back through end cap 38 and bracket 114 is attached to flanges 80 with screw 116. This allows the operator sufficient room to work on the cable 32.

Referring to FIG. 1, buffer tubes 34 typically extend from the fiber optic cables 32. Excess portions of the buffer tubes 34 are stored in slack baskets 120 that are adjacent to splice trays 122. Slack baskets 120 and splice trays 122 can be characterized as container-like devices for containing buffer tubes. The container-like devices are carried by the support member 67, and at least two of the container-like devices are positioned on opposite sides of the support member from one another. Therefore, one of the two container-like devices can be conveniently accessed without accessing the other of the two container-like devices.

Each slack basket 120 includes a tray-like base 124 and tabs 126 extending away from the tray-like base at an acute angle to define a region for containing buffer tubes 34. Each splice tray 122 includes a tray-like base, a splice organizer (not shown) mounted to the tray-like base and defining a plurality of parallel grooves for respectively receiving the optical fiber splices, and a removable cover to cover and protect the splice organizer. Within each splice tray 122, ends of the optical fibers extending from the buffer tubes 34 are spliced together.

As illustrated in FIG. 1, an upper group of the splice trays 122 and the upper slack basket 120 are connected to the upper side of the support member 67. Likewise, a lower group of the splice trays 122 and the lower slack basket 120 are attached to the lower side of the support member 67. Each of the splice trays 122 and the slack baskets 120 defines a pair of apertures that receive the respective pair of studs 84 or 86 (FIGS. 2 and 3) extending from the opposite sides of the support member 67, and those respective studs receive wing nuts (such as the wing nuts 88), or the like, to secure the splice trays and/or slack baskets to the support member. In addition, an elongate fastener, which is preferably a strap 128, is wrapped around the slack baskets 120 and splice trays 122 to assist in the securing of the slack baskets and the splice trays to the support member 67. The ends of the strap 128 preferably include pieces of attachment material, such as that sold under the trademark VELCRO, clasps, or other connecting mechanisms for allowing the strap 128 to securely retain the fiber buffer tubes in the slack baskets 120 and the splice trays 122. The rear extensions 90, 92 also play a role in optimally containing the buffer tubes 34, as is illustrated in FIG. 1.

In an alternative embodiment, the upper and lower bars 56, 58 are vertically spaced apart from one another along substantially all of the length of the support member 67, but that vertical space is less than the vertical space between the longitudinally extending parts 70,74 (FIGS. 2 and 3) of the forward upper and lower extensions 60,62. In accordance with this alternative embodiment, excess portions of buffer tubes 34 are coiled and placed in the space defined between the upper and lower bars 56, 58 along the support member 67.

Second Embodiment

An in-line splice closure of a second embodiment of the present invention is identical to the butt-type splice closure 20 (FIG. 1) of the first embodiment of the present invention, except for variations noted herein. The housing (not shown, but see the housing 22 of FIG. 1) of the in-line splice closure of the second embodiment defines openings at both the front and rear ends thereof. The in-line splice closure of the second embodiment includes an in-line support assembly that is movable between an enclosed configuration and an unenclosed configuration with respect to the housing of the closure of the second embodiment. More specifically, the housing of the second embodiment is longitudinally split along at least one side, the housing enclosing the in-line support assembly to provide the enclosed configuration, and the housing can be opened and removed from the assembly to provide the unenclosed configuration.

Figure 7:
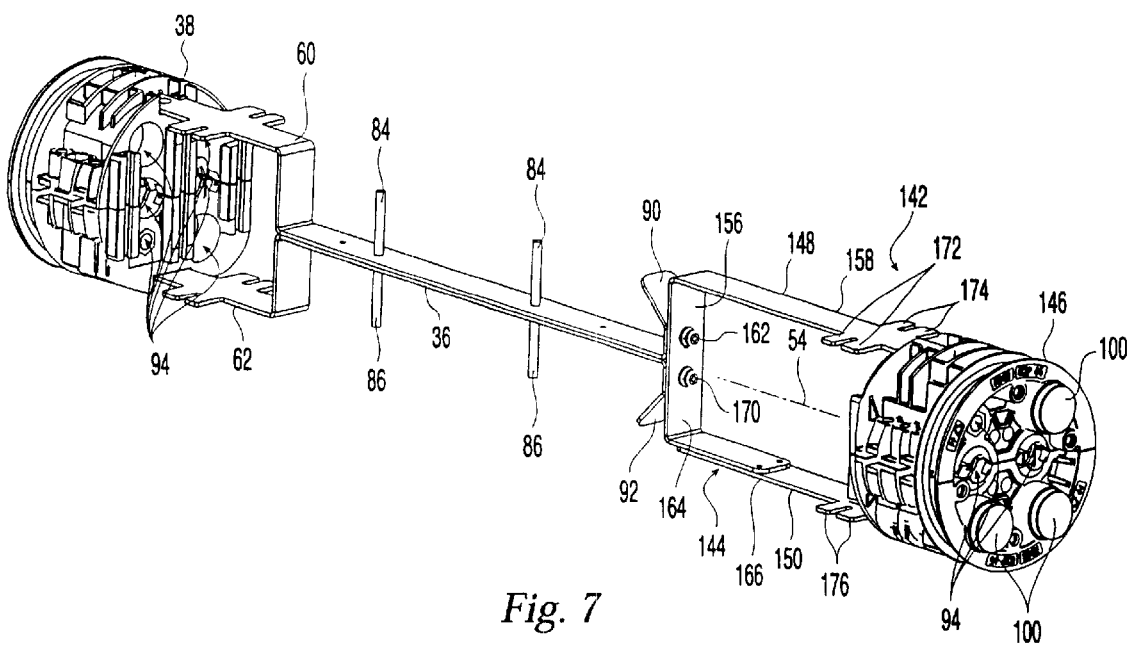
FIG. 7 is a perspective view of support frames and end caps of an in-line splice closure, in accordance with a second embodiment of the present invention.

FIG. 7 illustrates portions of the in-line support assembly of the in-line splice closure of the second embodiment. The in-line support assembly of the second embodiment includes the butt-type support assembly 33 (FIG. 1) of the first embodiment. As described above, the butt-type support assembly 33 includes the end cap 38 (also see FIGS. 1 and 4–6) and the butt-type support frame 36 (also see FIGS. 1–6). In accordance with the second embodiment, the butt-type support assembly 33 is mounted to a secondary support assembly 142. Secondary support assembly 142 includes a secondary support frame 144 mounted to the butt-type support frame 36. Secondary support assembly 142 further includes a secondary end cap 146. Secondary end cap 146 is generally identical to the end cap 38 of the butt-type support frame 33.

Figure 8:
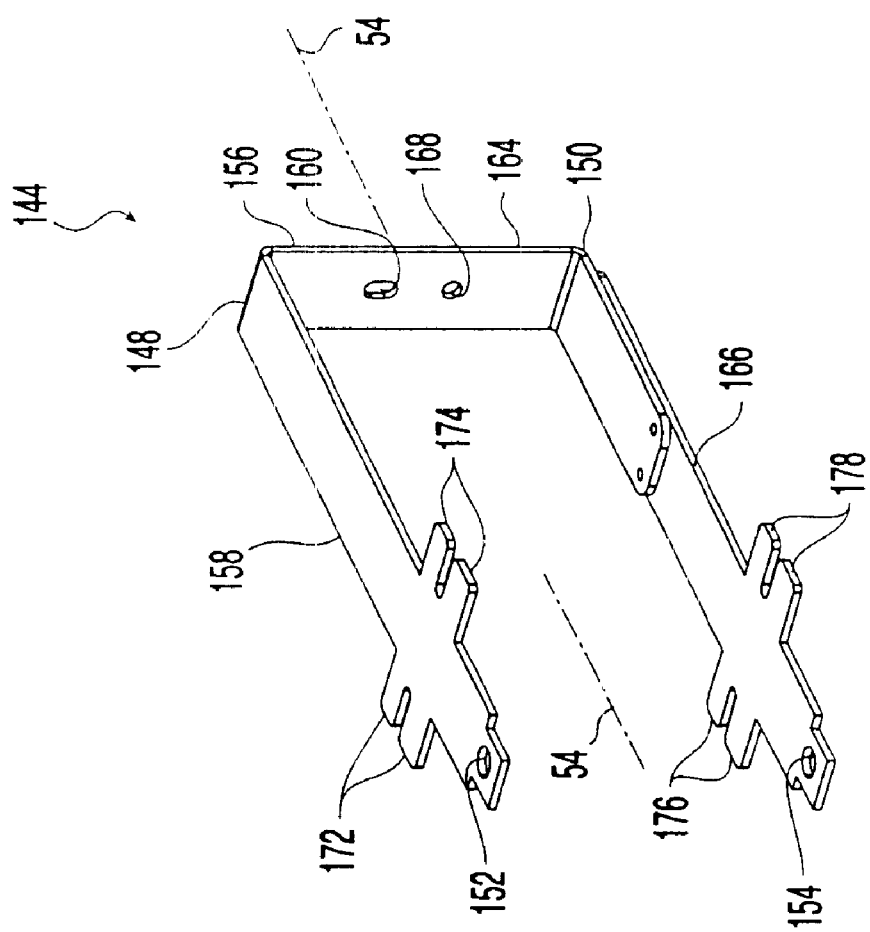
FIG. 8 is an isolated perspective view of a secondary support frame of the in-line splice closure of the second embodiment.

Secondary support frame 144 can be characterized as being two secondary rear extensions. More specifically, as oriented in FIG. 7, the upper portion of the secondary support frame 144 can be a secondary upper extension 148, and the lower portion of the secondary support frame can be characterized as a secondary lower extension 150. Secondary extensions 148, 150 are connected to the secondary end cap 146 in the same general manner in which the forward extensions 60, 62 are connected to the end cap 38. Referring to FIG. 8, an upper attachment hole 152 is defined through secondary upper extension 148. A bolt (not shown), or the like, passes through upper attachment hole 152 to attach the secondary upper extension 148 to the secondary end cap 146 (FIG. 7). Likewise, a lower attachment hole 154 is defined through the secondary lower extension 150. A bolt (not shown), or the like, passes through the lower attachment hole 154 to attach the secondary lower extension 150 to the secondary end cap 146. As best shown in FIG. 7, the secondary end cap 146 has a generally cylindrical peripheral or circumferential surface, and the secondary extensions 148, 150 are mounted to the secondary end cap proximate to opposite sides of the circumferential surface of the secondary end cap.

As shown in FIG. 7, the secondary upper extension 148 includes a radially extending part 156 extending generally radially away from the frame axis 54 (also see FIGS. 2 and 3) and a longitudinally extending part 158. Radially extending part 156 of the secondary upper extension 148 defines a forward upper attachment hole 160 (FIG. 8) that is aligned with a corresponding attachment hole 161 (FIG. 9) in upper rear extension 90. A threaded attachment device, such as screw 162, or the like, is received through those aligned holes 160, 161 to partially facilitate attachment between the support frame 36 and the secondary support assembly 142.

Likewise, and as best understood with reference to FIG. 7, the secondary lower extension 150 includes a generally radially extending part 164 and a longitudinally extending part 166. Radially extending part 164 of the secondary lower extension 150 defines a forward lower attachment hole 168 (FIG. 8) that is aligned with a corresponding attachment hole 169 (FIG. 9) in lower rear extension 92. A threaded attachment device, such as screw 170, or the like, is received through those aligned holes 168, 169 to partially facilitate attachment between the support frame 36 and the secondary support assembly 142.

As best seen in FIG. 8, the secondary upper extension 148 includes a pair of laterally extending and spaced apart right flanges 172, as well as laterally extending and spaced apart left flanges 174. Likewise, the secondary lower extension 150 includes laterally extending and spaced apart right flanges 176, as well as laterally extending and spaced apart left flanges 178.

In the embodiment of FIG. 7, each of the ports 94 of the secondary end cap 146, some of which are accessed by removing covers 100, respectively receive portions of fiber optic cables (see, for example, FIGS. 1 and 6). Each of the pairs of flanges 172, 174, 176, 178 (also see FIG. 8) receives a respective strain-relief bracket (for example see the strain-relief bracket 114 of FIGS. 1 and 6) that cooperates with a respective fiber optic cable in the manner described above for the first embodiment. Buffer tubes (for example see the buffer tubes 34 illustrated in FIGS. 1 and 6) extend from the fiber optic cables extending through the ports 94 of the secondary end cap 146. Excess portions of the buffer tubes are stored in the slack baskets 120 (FIG. 1) carried on opposite sides of the support frame 36 of the in-line splice closure of the second embodiment. Optical fibers of the fiber optic cables extending through the ports 94 of the secondary end cap 146 are spliced with optical fibers of fiber optic cables extending through ports 94 of the end cap 38. Those splices are organized within the splice trays 122 (FIG. 1) carried on opposite sides of the support frame 36 of the in-line splice closure of the second embodiment.

Secondary support assembly 142 (including secondary support frame 144 and end cap 146) could be provided (with an appropriate in-line type housing, fasteners, etc.) as a stand-alone kit. The kit would allow an operator to add the secondary support assembly 142 to support assembly 33 to change a butt-type enclosure (as in the first embodiment) to an in-line enclosure as that shown in FIG. 7 without a wholesale change in equipment and cable routing.

Third Embodiment

Figure 9:
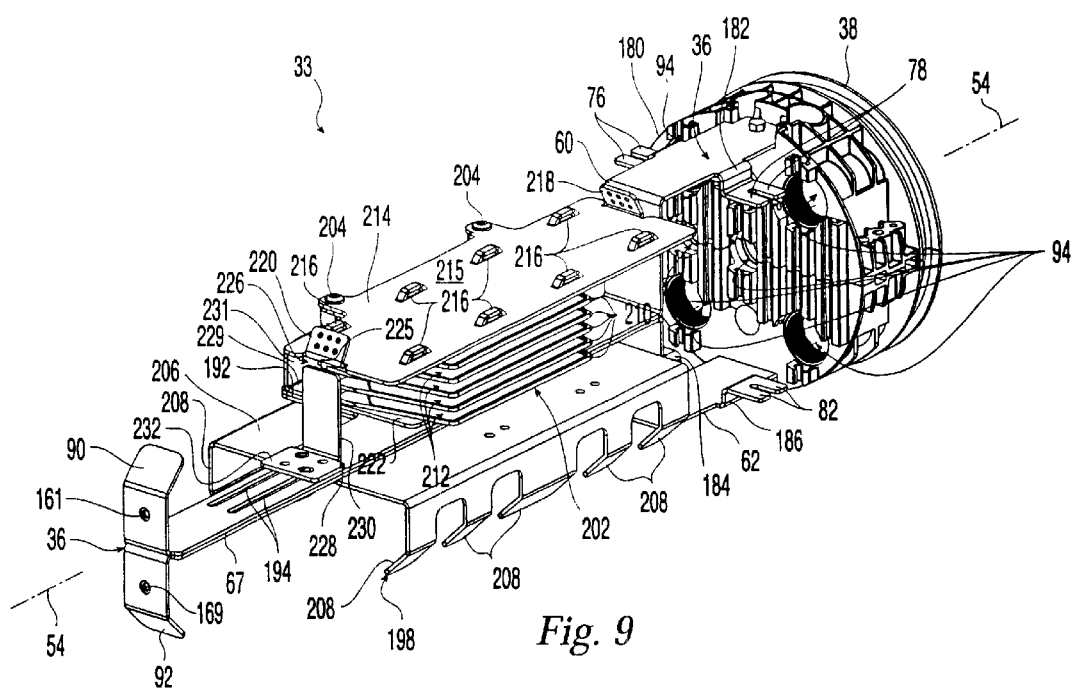
FIG. 9 is an isolated perspective view of a butt-type support assembly of a butt-type splice closure, in accordance with a third embodiment of the present invention.

A butt-type splice closure of a third embodiment of the present invention is identical to the butt-type splice closure 20 (FIG. 1) of the first embodiment of the present invention, except for variations noted herein. Portions of the butt-type support assembly of the butt-type splice closure of this embodiment are illustrated in FIG. 9. In accordance with this embodiment, each of the pairs of flanges 76, 78, 80, 82 (also see FIG. 8) is respectively part of a furcated member 180, 182, 184, 186. Each of the furcated members 180, 182, 184, 186 extends laterally away from the support frame 36 and toward the frame axis 54 so the pairs of flanges 76, 78, 80, 82 are optimally proximate to respective ports 94 to perform their strain-relief functions.

Figure 10:
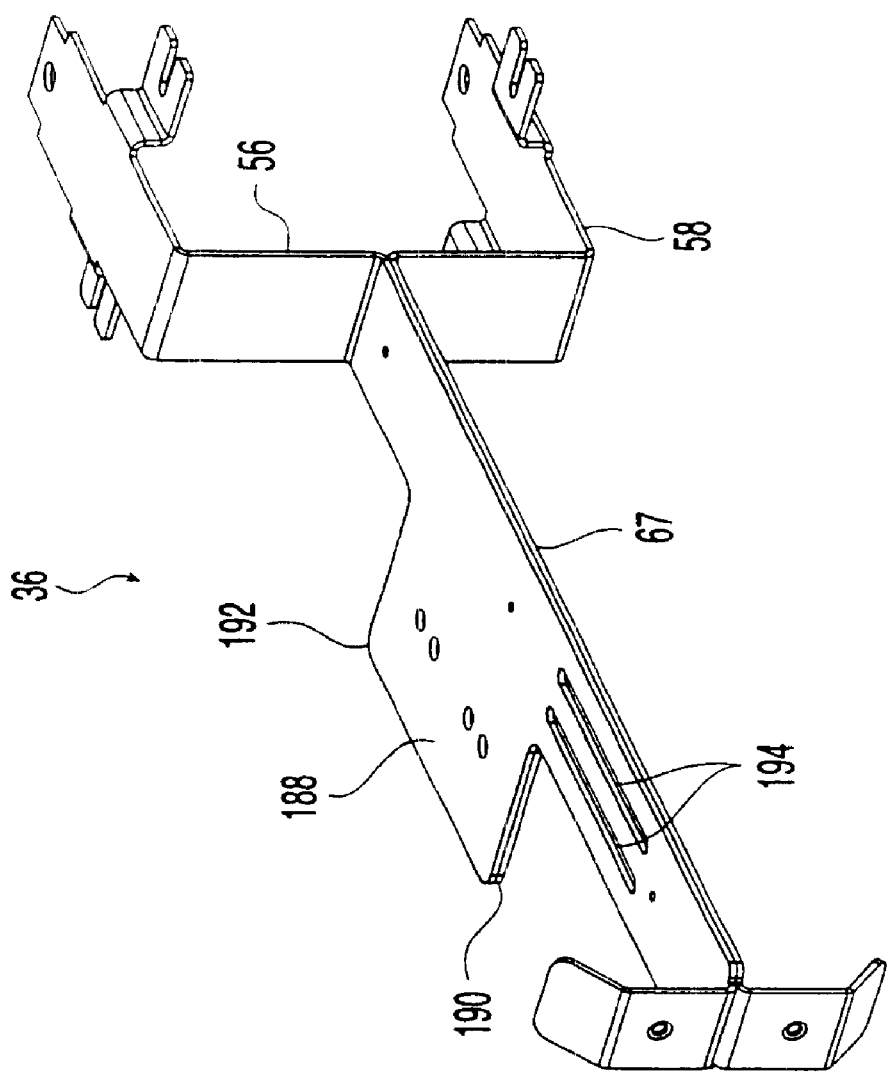
FIG. 10 is an isolated perspective view of a butt-type support frame of the butt-type support assembly of FIG. 9.

As best understood with reference to FIG. 10, which is an isolated view of the support frame 36, each of the upper and lower bars 56, 58 respectively includes laterally extending plate-like parts 188, 190. The plate-like parts 188, 190 overlap to define a mounting region 192 of the support member 67. Also in accordance with the third embodiment, each of the upper and lower bars 56, 58 defines a pair of longitudinally extending apertures that overlap to define a pair of longitudinally extending slots 194 extending through the support member 67.

Referring to FIG. 9, in accordance with the illustrated example of the third embodiment, a slack basket 198 is mounted to the bottom surface of the support member 67. The slack basket 198 includes a tray-like base 206 and tabs 208 extending away from the tray-like base at an acute angle to define a region for containing buffer tubes (for example see buffer tubes 34 illustrated in FIGS. 1 and 6) that contain optical fibers. The slack basket 198 is acceptably mounted to the support member 67 by threaded attachment devices, such as a pair of screws (not shown), or the like, that extend through a pair of apertures defined through the slack basket 198 and thread into apertures defined in the mounting region 192 of the support member.

An organizer assembly 202 is also mounted to the top surface of the support member 67. The organizer assembly 202 includes a plurality of spaced apart partitions 210 defining a plurality of receptacles 212 for respectively receiving splice trays, such as the splice trays 122 (FIG. 1). The organizer assembly 202 is acceptably mounted to the support member 67 by threaded attachment devices, such as a pair of screws 204, or the like, extending through a pair of passages defined through the organizer assembly and threaded into apertures defined in the mounting region 192 of the support member. The slack basket 198 and the organizer assembly 202 can be characterized as container-like devices for containing optical fibers. The optical fibers contained by the slack basket 198 are preferably disposed within buffer tubes (for example see the buffer tubes 34 illustrated in FIGS. 1 and 6).

A transition plate 214 is mounted above and with organizer assembly 202. Transition plate 214 advantageously facilitates the routing of optical fibers within the closure of the third embodiment. The transition plate 214 includes an outer surface 215 extending between peripheral edges of transition plate 214. Transition plate 214 includes multiple protrusions protruding angularly away from the outer surface 215. The protrusions define one or more apertures for receiving a tie, or the like, that holds buffer tubes 34 (FIGS. 1 and 6) routed proximate to the transition plate, as will be discussed in greater detail below. The protrusions of the transition plate 214 are in the form of arches 216 and front and rear tabs 218, 220, or the like. Arches 216 are preferably arranged along and proximate to the long side edges of the transition plate 214. Tabs 218, 220 respectively extend at an acute angle away from proximate to the front and rear edges of transition plate 214. Whereas arches 216 define a single aperture, each of the tabs 218, 220 defines multiple apertures. As mentioned above, each of the apertures defined by the arches 216 and the tabs 218, 220 are designated to receive ties or the like that hold buffer tubes 34 that are routed proximate to the transition plate 214.

Figure 11:
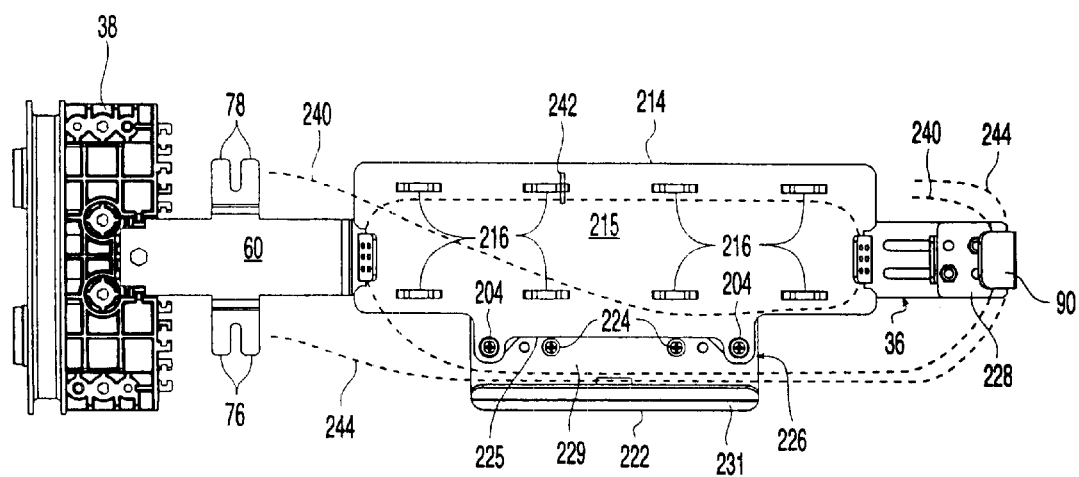
FIG. 11 is a partially schematic, top plan view of portions of the butt-type support assembly of FIG. 9 with bundles of buffer tubes, in accordance with one example of the third embodiment of the present invention.

As best seen in FIGS. 9 and 11, a channel plate 222 is mounted below the organizer assembly 202. Channel plate 222 is mounted to support member 67 by attachment devices, such as a pair of screws 224 (FIG. 11), or the like, extending through apertures defined through the channel plate and threaded into apertures defined in the mounting region 192 of the support member. Channel plate 222 defines a longitudinally extending channel 226 positioned at the back side of organizer assembly 202. Channel 226 advantageously facilitates the routing of optical fibers within the closure of the third embodiment.

More specifically, channel 226 is open at its opposite ends, and channel 226 further has an elongate opening extending between its opposite ends. As best seen in FIG. 11, channel 226 is partially defined by a longitudinally extending back side 225 of the organizer assembly 202 (FIG. 9). Back side 225 is opposite from the primary openings to the receptacles 212 (FIG. 9) of organizer assembly 202. Channel 226 is further partially defined by a base wall-like part 229 of the channel plate 222. Base wall-like part 229 extends in the longitudinal direction, generally perpendicular to back side 225 of organizer assembly 202, and laterally away from the back side of the organizer assembly. Channel 226 is further partially defined by a side wall-like part 231 of channel plate 222. Side wall-like part 231 extends in the longitudinal direction, generally perpendicular to the base wall-like part 229 of the channel plate 222, and away from the base wall-like part of the channel plate.

As best seen in FIG. 9, in accordance with the third embodiment, an adjustment bracket 228 is mounted for movement along the slots 194 extending along a rear section of support member 67. Adjustment bracket 228 includes an upright 230 extending upwardly and perpendicularly from a base 232. Base 232 includes multiple apertures that are respectively aligned with the slots 194. At least two of the apertures through the base 232 receive threaded attachment devices, such as a pair of screws (not shown), or the like. The threaded attachment devices extend through the slots 194 and thread into respective apertures in base 232 to movably mount adjustment bracket 228 to support member 67.

The butt-type support assembly receives fiber optic cables (e.g., fiber optic cables 32 of FIGS. 1 and 6) through respective ports 94 of the end cap 38. Each of the pairs of flanges 172, 174, 176, 178 or selected pairs thereof, respectively receives a strain-relief bracket (e.g., strain-relief bracket 114 of FIGS. 1 and 6) for cooperating with a respective fiber optic cable in the manner described above. Buffer tubes extend from the fiber optic cables extending through ports 94 of end cap 38. Excess portions of the buffer tubes are stored in slack basket 198. Optical fibers from the fiber optic cables extending through the ports 94 of the end cap 38 are spliced together within splice trays that are removably held within respective receptacles 212 of organizer assembly 202. Adjuster bracket 228 is moved forward along slots 194 of support member 67 so upright 230 of the adjuster bracket abuts the rear end of the splice trays within the organizer assembly 202. One or more straps (for example see the strap 128 illustrated in FIG. 1) are wrapped around organizer assembly 202 and slack basket 198 and assist in the securing of the splice trays and excess portions of the buffer tubes to the support member 36.

FIG. 11 schematically illustrates one way to route a buffer tube bundle 240 or the like, which is depicted as a series of generally uniform dashed lines. The buffer tube bundle 240 extends from a fiber optic cable (for example see the fiber optic cables 32 illustrated in FIGS. 1 and 6) extending through the port 94 (FIG. 9) closest to the left flanges 78 of the forward upper extension 60. The fiber optic cable from which the buffer tube bundle 240 extends is held by a strain-relief bracket (for example see the strain-relief bracket 114 of FIGS. 1 and 6) mounted to the left flanges 78. The buffer tube bundle 240 extends from a location proximate to the left flanges 78 and across a portion of the transition plate 214, where the buffer tube bundle 240 is connected to an arch 216 by a tie 242, such as a conventional cable tie, or the like. Thereafter, the buffer tube bundle 240 extends through the channel 226, abuts the forward surface of the upper rear extension 90, and is received into the rear end of a splice tray (for example see the splice trays 122 illustrated in FIG. 1) removably held within a respective receptacle 212 (FIG. 9) of the organizer assembly 202 (FIG. 9).

FIG. 11 schematically illustrates another buffer tube bundle 244 (for example see the buffer tubes 34 illustrated in FIGS. 1 and 6), or the like, as a series of two short dashes alternating with one long dash. The buffer tube bundle 244 extends from a fiber optic cable (for example see the fiber optic cables 32 illustrated in FIGS. 1 and 6) extending through the port 94 (FIG. 9) closest to the right flanges 76 of the forward upper extension 60. The fiber optic cable from which the buffer tube bundle 244 extends is held by a strain-relief bracket mounted to the right flanges 76. The buffer tube bundle 244 extends rearward from a location proximate to the right flanges 76, through the channel 226, abuts the forward surface of the upper rear extension 90, and is received into the rear end of a splice tray (for example see the splice trays 122 illustrated in FIG. 1) that is removably held within a respective receptacle 212 (FIG. 9) of the organizer assembly 202 (FIG. 9).

In accordance with an alternative embodiment, the buffer tube bundle 244 originates from a fiber optic cable that extends through the port 94 (FIG. 9) closest to the right flanges 80 (FIG. 3) of the forward lower extension 62 (FIG. 9). In this alternative embodiment, the fiber optic cable from which the buffer tube bundle 244 extends is held by a strain-relief bracket mounted to the flanges 80.

Support frames 36 of various lengths are within the scope of the present invention. For example, the support frame 36 illustrated in FIG. 11 is shorter than the support frame illustrated in FIG. 9. It is also within the scope of the present invention for the container-like devices for containing optical fibers to be interchangeable. For example, and as best understood with reference to FIG. 9, in accordance with an alternative embodiment of the present invention, the slack basket 198 of the support assembly of the third embodiment is replaced with an organizer assembly, transition plate, and channel plate. The butt-type support assembly of this alternative embodiment includes two adjuster brackets 228, one on each side of the support member 67. The two adjuster brackets 228 of this alternative embodiment are held to the support member 67 by common screws, or the like, that extend through the slots 194 and thread into apertures in the bases 232 of the adjuster brackets, so that the adjuster brackets move in unison.

Fourth Embodiment

Figure 12:
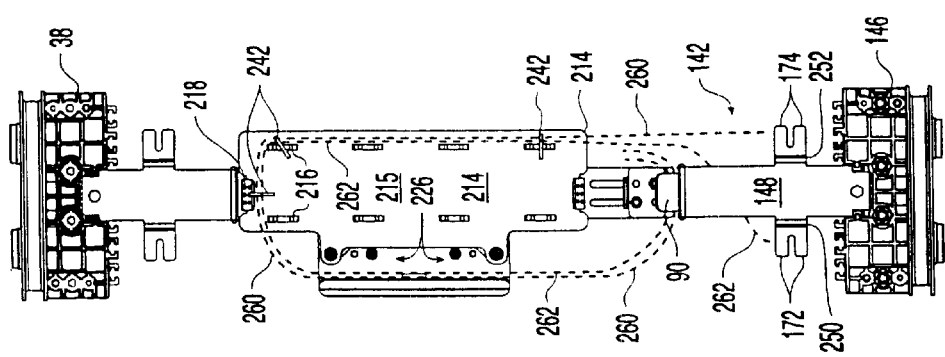
FIG. 12 is a partially schematic, top plan view of portions of an in-line support assembly of a splice closure with bundles of buffer tubes, in accordance with a fourth embodiment of the present invention.

An in-line splice closure of a fourth embodiment of the present invention is identical to the in-line splice closure of the second embodiment of the present invention, except for variations noted herein and variations that will be apparent to those of ordinary skill in the art. FIG. 12 illustrates portions of the in-line support assembly of the in-line closure of the fourth embodiment. The in-line support assembly of the fourth embodiment includes a secondary support assembly 142 mounted to the butt-type support assembly 33 (FIG. 9) of the third embodiment. The slack basket 198 (FIG. 9) of the butt-type support assembly 33 of the third embodiment is not illustrated in FIG. 12. Also, the organizer assembly 202 (FIG. 9) is hidden from view in FIG. 12.

Figure 13:
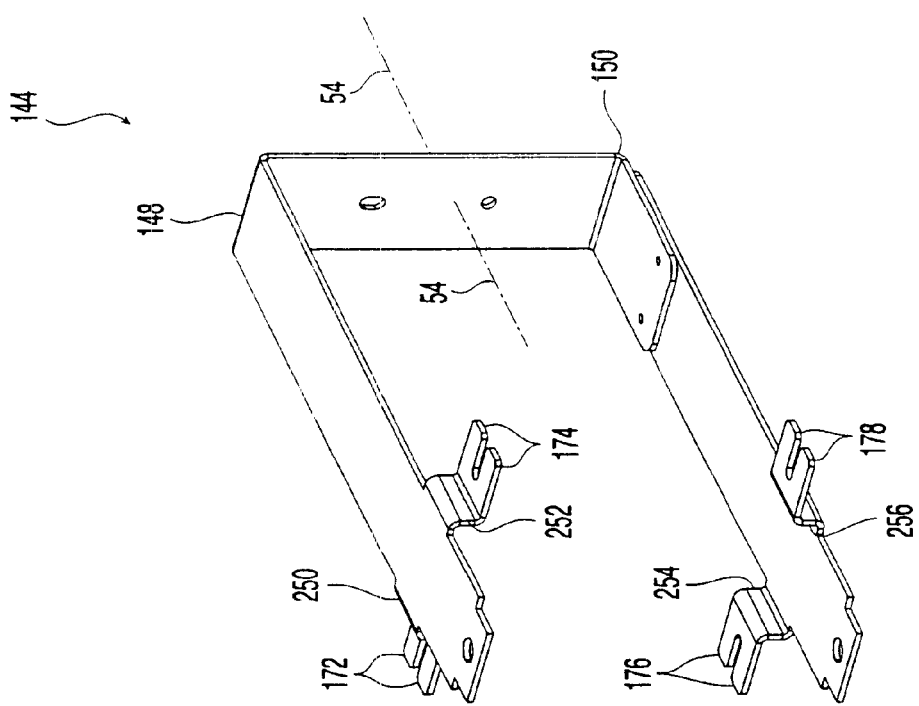
FIG. 13 is an isolated perspective view of a secondary support frame of the in-line support assembly of FIG. 12.

As best seen in FIG. 13, in accordance with the fourth embodiment, the secondary support frame 144 is constructed so each of the pairs of flanges 172, 174, 176, 178 is respectively part of a furcated member 250, 252, 254, 256. Each of the furcated members 250, 252, 254, 256 extends laterally away from the secondary support frame 144 and toward the frame axis 54 so the pairs of flanges 172, 174, 176, 178 are optimally proximate to respective ports 94 (FIG. 9) of the secondary end cap 146.

FIG. 12 schematically illustrates a buffer tube bundle 260 (for example see the buffer tubes 34 illustrated in FIGS. 1 and 6), or the like, as a series of generally uniform dashed lines, in accordance with one example of the fourth embodiment of the present invention. FIG. 12 also schematically illustrates another buffer tube bundle 262, or the like, as a series of two short dashes alternating with one long dash, in accordance with one example of the fourth embodiment of the present invention. Each buffer tube bundle 260, 262 extends from a respective fiber optic cable (for example see the fiber optic cables 32 illustrated in FIGS. 1 and 6) extending through a respective port 94 (FIG. 9) of the secondary end cap 146. Each of those fiber optic cables is secured by a respective strain-relief bracket (for example see the strain-relief bracket 114 of FIGS. 1 and 6) mounted to a respective pair of flanges selected from the flanges 172, 174, 176, 178 (also see FIG. 13). The buffer tube bundles 260, 262 extend together through a series of ties 242, such as a conventional cable ties, or the like. Two of the ties 242 are connected to respective arches 216 of the transition plate 214, and the other of the ties 242 is connected to the front tab 218 of the transition plate. Thereafter, the buffer tube bundles 260, 262 extend through the channel 226, abut the forward surface of the upper rear extension 90, and are received into the rear ends of splice trays (for example see the splice trays 122 illustrated in FIG. 1) removably held within respective receptacles 212 (FIG. 9) of the organizer assembly 202 (FIG. 9).

Fifth Embodiment

Figure 14:
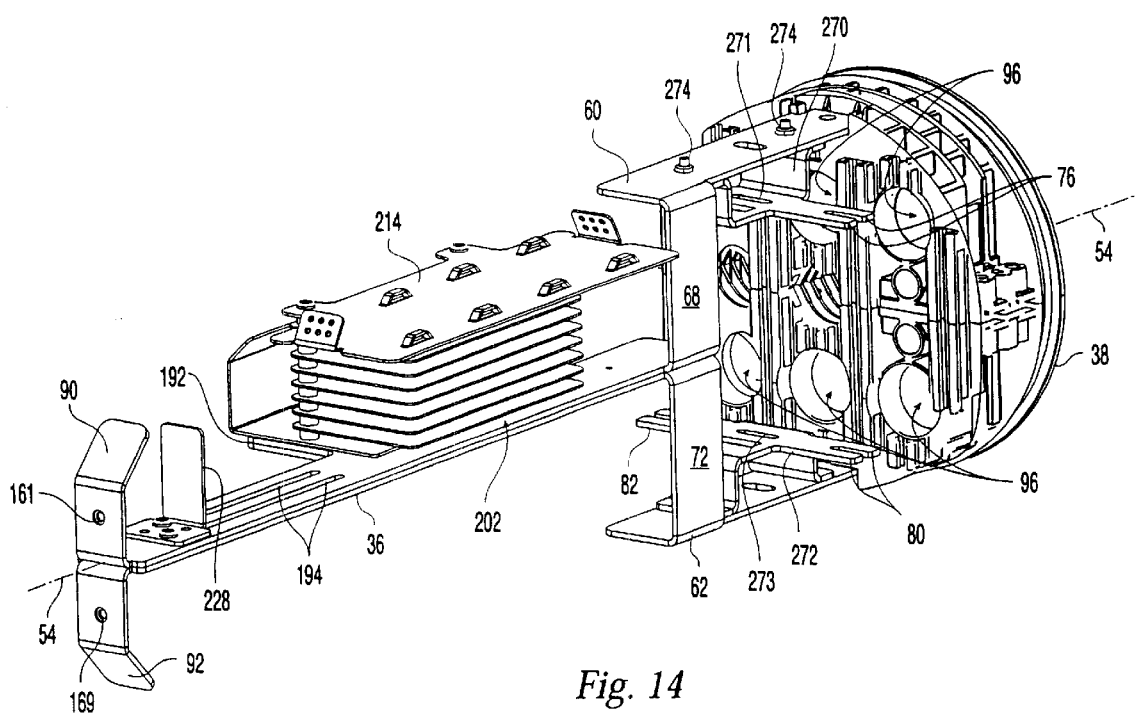
FIG. 14 is an isolated perspective view of portions of a butt-type support assembly of a butt-type splice closure, in accordance with a fifth embodiment of the present invention.

A butt-type splice closure of a fifth embodiment of the present invention is identical to the butt-type splice closure of the third embodiment of the present invention, except for variations noted herein and variations that will be apparent to those of ordinary skill in the art. Portions of the butt-type support assembly of the butt-type splice closure of the fifth embodiment are illustrated in FIG. 14. Although not shown in FIG. 14, in accordance with one example of the fifth embodiment, a slack basket (for example see the slack basket 198 illustrated in FIG. 9) is mounted to the bottom surface of the mounting region 192 of the support frame 32. In accordance with another example of the fifth embodiment, the combination of an organizer assembly, transition plate, and channel plate is mounted to the bottom surface of the mounting region 192 of the support frame 32. In accordance with the latter example, the butt-type support assembly of the fifth embodiment includes two organizer assemblies 202 mounted on opposite sides of the mounting region 192, two channel plates 222 mounted on opposite sides of the mounting region, and two transition plates 214 mounted on opposite sides of the mounting region.

As best understood with reference to FIG. 14, each of the pairs of flanges 76, 78, 80, 82 is respectively part of upper and lower brackets 270, 272. The upper and lower brackets 270, 272 are identical, except that they are oppositely oriented from one another. The upper bracket 270 is removably mounted to the forward upper extension 60 by a pair of studs 274 that extend through respective apertures defined through the forward upper extension 60 and receive nuts (not shown), or the like. The upper bracket 270 defines an aperture 271 for receiving a screw, or the like, so a strain-relief bracket (for example see the strain-relief bracket 114 of FIGS. 1 and 6) can be mounted to the upper bracket 270 via the aperture 271. Likewise, the lower bracket 272 is removably mounted to the forward lower extension 62 by a pair of studs (not shown) that extend through respective apertures (not shown) defined through the forward lower extension 62 and receive nuts (not shown), or the like. The lower bracket 272 defines an aperture 273 for receiving a screw, or the like, so a strain-relief bracket (for example see the strain-relief bracket 114 of FIGS. 1 and 6) can be mounted to the lower bracket 272 via the aperture 273. The pairs of flanges 76, 78, 80, 82 and apertures 271, 273 are positioned with respect to respective ports 96 of the end cap 38 for optimally holding strain-relief brackets proximate thereto.

In accordance with the fifth embodiment, the radially extending part 68 of the forward upper extension 60 and the radially extending part 72 of the forward lower extension 62 are arranged so buffer tubes (for example see the buffer tubes 34 illustrated in FIGS. 1 and 6) extending from fiber optic cables (for example see the fiber optic cables 32 illustrated in FIGS. 1 and 6) extending through the central column of ports 96 defined through the end cap 38 need not be bent excessively as they extend past the radially extending parts 68, 72. More specifically, in accordance with the fifth embodiment, the radially extending parts 68, 72 of the support frame 36 define and extend generally in a common plane that is generally parallel to the frame axis 54. In contrast, in accordance with the first through fourth embodiments (FIGS. 1–13), the radially extending parts 68, 72 of the support frame 36 extend generally in a common plane that is generally perpendicular to the frame axis 54.

Sixth Embodiment

Figure 15:
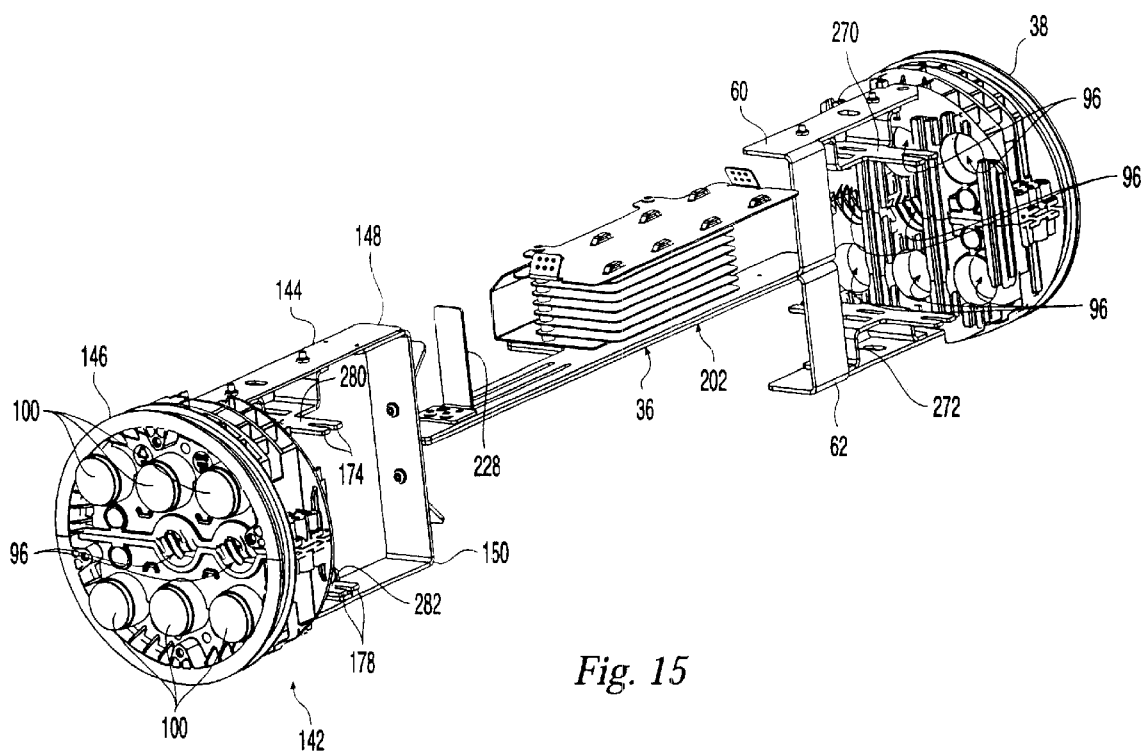
FIG. 15 is a perspective view of an in-line support assembly of an in-line splice closure, in accordance with a sixth embodiment of the present invention.

An in-line splice closure of a sixth embodiment of the present invention is identical to the in-line splice closure of the fourth embodiment of the present invention, except for variations noted herein and variations that will be apparent to those of ordinary skill in the art. FIG. 15 illustrates portions of the in-line support assembly of the in-line closure of the sixth embodiment. The in-line support assembly of the sixth embodiment includes a secondary support assembly 142 mounted to the butt-type support assembly of the fifth embodiment (see FIG. 14).

In accordance with the sixth embodiment, each of the pairs of flanges 172, 174, 176, 178 (also see FIG. 8) of the secondary support frame 144 is respectively part of upper and lower brackets 280, 282. The upper and lower brackets 280, 282 are identical to the upper and lower brackets 270, 272. The upper and lower brackets 280, 282 are associated with and function with respect to the secondary end cap 146 and the secondary support frame 144 in the same general manner as the upper and lower brackets 270, 272 are associated with and function with respect to the end cap 38 and the support frame 36.

Advantageously, the present invention provides splice closure structures that enhance the capability for optimally carrying and providing access to large numbers of fiber optic cables, optical fibers, and optical fiber splices.

Whereas components of the present invention can be placed in many different orientations, components are at times described herein as being in a particular orientation for purposes of explanation, and not for purposes of limitation.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A converting assembly capable of creating an in-line closure from a first end cap and a first support frame of a butt-type closure, the converting assembly comprising:

a second support frame having opposite front and rear ends, wherein the front end of the second support frame is capable of being connected to the a rear end of the first support frame;

a second end cap capable of being connected to the rear end of the second support frame; and an elongate housing having opposite front and rear ends, wherein the housing defines an internal cavity, a front opening to the internal cavity at the front end of the housing, and a rear opening to the internal cavity at the rear end of the housing, and wherein the front and rear openings are capable of being contemporaneously respectively occluded by the first and second end caps while the first end cap is connected to a front end of the first support frame, the second end cap is connected to the rear end of the second support frame, and the front end of the second support frame is connected to the rear end of the first support frame so that the first and second support frames are within the internal cavity of the housing to provide an enclosed configuration.

2. A converting assembly according to claim 1, wherein the second support frame defines a generally U-like shape.

3. A converting assembly according to claim 1, wherein:

the housing defines a housing axis extending between the front and rear ends of the housing; and the second support frame defines a frame axis extending between the front and rear ends of the second support frame, and the frame axis is generally parallel to the housing axis in the enclosed configuration.

4. A converting assembly according to claim 3, wherein the second support frame comprises:

a generally radially extending part extending generally radially outward from the frame axis and having opposite ends positioned generally on opposite sides of the frame axis, and first and second extensions, wherein the first extension is connected to the radially extending part proximate one end the radially extending part and the second extension is connected to the radially extending part proximate the other end of the radially extending part, and wherein each of the first and second extensions extend generally in the longitudinal direction and are positioned between the radially extending part and the second end cap while the second end cap is connected to the rear end of the second support frame.

5. A closure according to claim 4, wherein the second end cap is generally cylindrical and comprises a circumferential surface, and the first and second extensions are mounted to the end cap proximate the circumferential surface.

6. A converting assembly according to claim 4, further comprising an attachment mechanism operative for mounting the radially extending part to the rear end of the first support frame.

7. A method of creating an in-line closure, the method comprising:

providing a first support frame and a first end cap, wherein the first support frame has opposite front and rear ends, and the first end cap is capable of being connected to the front end of the first support frame, wherein the first support frame and the first end cap are operative for cooperating with a first housing defining an internal cavity and having a closed rear end and an opposite front end defining a front opening to the internal cavity, and wherein the first end cap is capable of occluding the front opening to define a first enclosed configuration while the first end cap is connected to the front end of the first support frame and the first support frame is within the internal cavity;

connecting a front end of a second support frame to the rear end of the first support frame;

connecting a second end cap to a rear end of the second support frame;

providing a second housing having opposite front and rear ends, and defining:

an internal cavity, a front opening to the internal cavity of the second housing, wherein the front opening of the second housing is positioned at the front end of the second housing, and, a rear opening to the internal cavity of the second housing, wherein the rear opening of the second housing is positioned at the rear end of the second housing; and contemporaneously occluding the front and rear openings of the second housing respectively with the first and second end caps while the first end cap is connected to the front end of the first support frame, the front end of the second support frame is connected to the rear end of the first support frame, and the second end cap is connected to the rear end of the second support frame so the first and second support frames are within the internal cavity of the second housing.

8. The method according to claim 7, further comprising providing the first housing and removing the first end cap and the first support frame respectively from the front opening and the internal cavity of the first housing prior to connecting of the second support frame to the first support frame.

9. The method according to claim 7, wherein the step of connecting the front end of the second support frame to the rear end of the first support frame comprises aligning an aperture defined in the front end of the second support frame with an aperture defined in the rear end of the first support frame and extending an attachment device through the aligned apertures.

\* \* \* \* \*